United States Patent Office 3,522,917
Patented Aug. 4, 1970

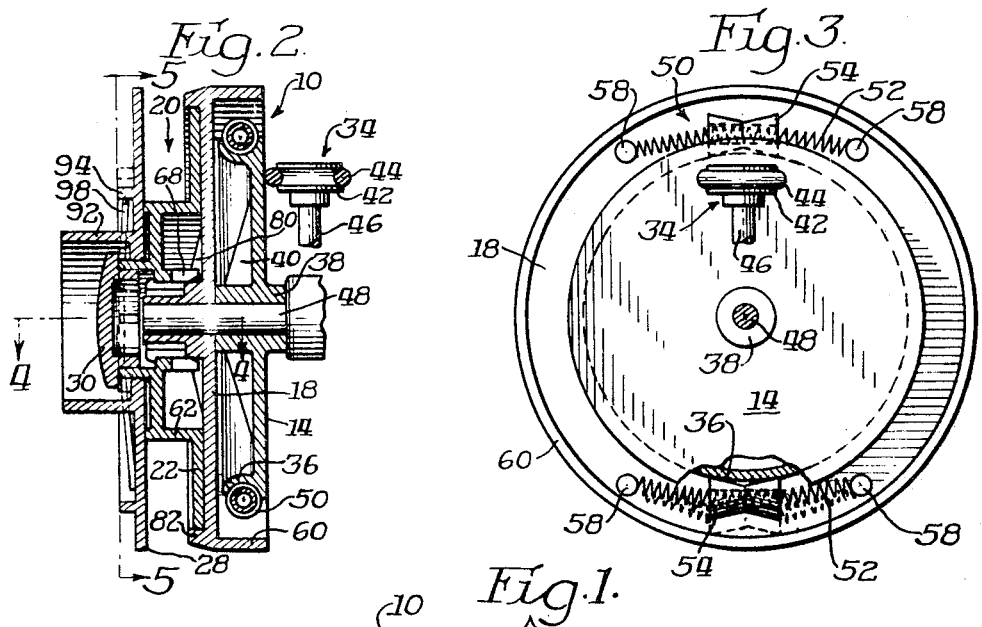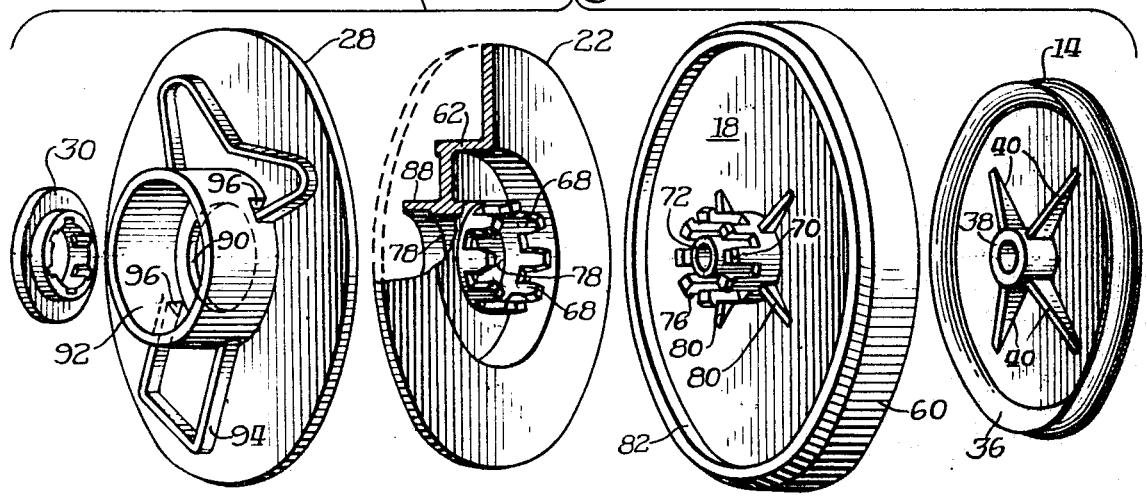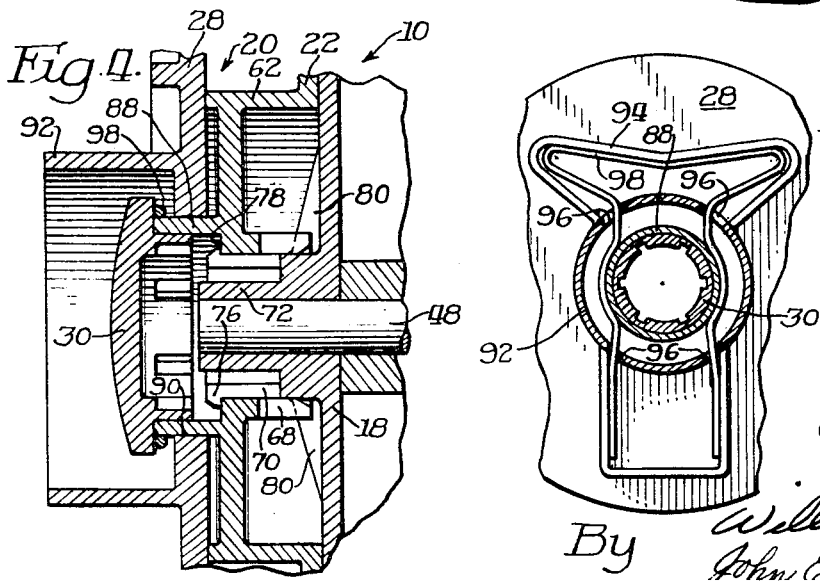

3,522,917
REEL ASSEMBLY WITH CENTRIFUGAL CLUTCH
Oldrich Frye, Chicago, Ill., assignor to Bell & Howell Company, Chicago, Ill., a corporation of Illinois
Filed Nov. 24, 1967, Ser. No. 685,677
Int. Cl. G03b 1/04; G11b 15/32, 23/04
U.S. Cl. 242—197
12 Claims

ABSTRACT OF THE DISCLOSURE

A reel assembly having a separable reel and reel support structure unidirectionally and continuously drivable by power in a forward mode, yet being drivable solely by film removal in a reverse mode or a rewind mode. The reel with film thereon may be removed from the reel support structure by a grip extending outwardly from the outer reel flange. This grip can be manually held to define the sole axis of reel support as the film is unwound from the separated reel, and to restrain that flange against rotation as the film is removed from the reel. The reel can be readily recoupled to the support structure.

---

This invention relates to a web take-up reel assembly for a web handling apparatus and particularly to an assembly wherein the reel is separable from a reel support. Further, the assembly is unidirectionally and continuously powered for forward take-up mode, but counter-rotatable by film being removed therefrom during reverse and rewind modes.

In the past, many types of web handling apparatus have been proposed. In a particular type of apparatus such as motion picture film projectors, unique problems have been encountered in the area of the web or film take-up structure. As film is moved through the projector by known components of projectors, the length of film already projected must be wound upon a take-up reel. To ensure proper movement of the film from the last driven component of the projector, that take-up reel must be powered for the forward take-up mode. Nevertheless, for operation of the projector in a reverse mode or a rewind mode, the take-up reel must function substantially as a supply reel. That is, the reel must be able to be rotated reversely to the forward mode direction of rotation by the pull of film therefrom. Hence, for the take-up reel assembly in these projectors to be reliable in both directions, rather complex structures were used.

A novel problem has arisen with respect to the more recent compact style projector of the automatic threading, automatic rewind variety. This problem is particularly critical in a projector wherein several films may in turn be fed through the projector to a take-up, and rewound into the supply facility of that projector. Because of the lack of space in compact style projectors and the greater complexity of the mechanisms, little room is available to manipulate film to re-thread it back onto the supply and into the film path of the projector should the trailing end pull from the supply. Although removable reels are well known in the art, the problem of enabling easy re-threading of film, which the instant removable reel seeks to solve, has not been heretofore contemplated.

As to the described clutch problems, the instant invention seeks to overcome the same by driving the take-up reel assembly unidirectionally and continuously through friction engagement with a driver powered by the projector. By the frictional engagement the driver tends to rotate the take-up reel in a single direction for take-up. However, upon operation of the projector in reverse mode, the friction drive is overcome so that the web can be pulled from the reel without creating undue strain on other projector film drive components.

At the end of a reverse mode operation, the friction drive overcomes the inertia generated by the unwinding of the film, stops the reel, and quickly begins rotating the reel in a forward mode. Because of this friction drive arrangement, special gearing is not required to stop the take-up reel if the projector is placed in a still projection mode. Since no film is moved toward the reel in the still mode, the reel is restrained from rotation by the tension in the film. The driver may continue to power one component of the assembly but the friction of this drive is insufficient to overcome the restraining force created on the film by the pressure and aperture plates in the projection gate. Since the friction in this drive is limited, there is insufficient tension on the film to either rotate the reel or break the film.

The friction drive further includes a centrifugally controlled mass to provide a drive free rewind mode. The mass normally engages a driven disk to drive the reel support and reel. However, when film is pulled from the reel at high rewind rates, the reel attains rotational rates sufficient to cause the mass to move away from the driven disk. Thus, the drive does not increase the force required to rewind the film onto the supply of the projector, and in fact, provides for a faster rewind capability than with conventional systems in that there is no frictional drag of the take-up system during rewind. In view of the above, the several modes of operation required for a take-up reel are seen to be ideally accomplished by the instant invention.

The instant invention also solves the last mentioned problems. A reel structure including a pair of flanges and hub structure is separably coupled to a drivable reel support. When coupled, the reel functions in the manner of a conventional reel. However, when separated, the reel can be manually held by a grip to provide an axis about which the hub structure and the flange remote from the grip are rotatable. With this construction, should the film's end pull from the supply reel, the take-up reel can be removed from the support wherein that film end can be readily re-attached to the supply and rewound from that take-up reel. The grip and the reel flange associated therewith prevent possible injury to the operator as the film moves from the reel at a high linear rate. A multi-fingered coupling structure enables quick re-assembly of the reel to the reel support.

It is an object of this invention to provide a novel reel assembly having a reel separable from a reel support.

It is another object of this invention to provide a novel friction drive for the reel assembly wherein the operation modes are ideally performed by the take-up reel.

It is another object of this invention to provide a novel centrifugal clutch arrangement for a reel assembly which allows the reel to rotate in a direction opposite to that in which it is normally driven without placing undue strain on a film or web material thereon which may be unwound therefrom.

It is another object of this invention to provide a reel providing an integral rotational axis.

It is a further object of this invention to provide a novel reel assembly having the foregoing characteristics which will be efficient in use, durable, and which can be manufactured for a reasonable cost.

Further and other objects will be apparent from the description of the accompanying drawings in which like numerals refer to like parts.

FIG. 1 is an exploded view of the major components of a take-up reel assembly, in perspective, with portions broken away in part;

FIG. 2 is a sectional elevational view of the take-up reel assembly;

FIG. 3 is an elevational rear view of the take-up reel assembly;

FIG. 4 is an enlarged sectional view of the hub of the reel assembly taken along line 4—4 in FIG. 2; and FIG. 5 is a view, partially in section, taken along line 5—5 of FIG. 2.

Referring to FIG. 1, the major components of a take-up reel assembly 10 intended for use on a web handling apparatus, such as a motion picture projector are shown. Reel assembly 10 includes a driven clutch disc 14, a drivable reel support plate 18, and a reel 20 comprised of an inner reel flange 22, an outer reel flange 28, and a retainer cap 30. These components are formed of a moldable, relatively rigid, and durable material, such as, for example, any one of a number of well known plastic materials. In FIGS. 2 and 4, the components are shown assembled for operation whereby a web, such as film (not shown), can be wound between flanges 22 and 28, or unwound from between these flanges for return to a supply of the apparatus.

Take-up reel assembly 10, and in particular, driven clutch disc 14, are powered in forward take-up mode by unidirectionally rotated driver 34. Clutch disc 14 includes a peripheral rim portion 36, a central bearing portion 38, and in a preferred embodiment, rigidifying spokes 40. Driver 34 is disclosed as a wheel 42 having a friction inducing tire 44 therearound. In this preferred embodiment, wheel 42 is fixed to a drive shaft 46, which shaft is powered by the projector's motor (not shown). When the motor is energized, driver 34 powers driven disc 14 to take up the film by rotation about assembly support shaft 48.

Power from driven clutch disc 14 is transmitted to reel support disc 18 through a centrifugal clutch arrangement 50. This clutch comprises a spring 52 which normally biases a small mass, such as weight 54, against the peripheral rim 36 of driven clutch disc 14. Spring 52 is supported under a slight tension between a pair of spring attaching members 58, shown as pins, extending from the reel support plate 18 transversely of the plane of that plate. Weight 54 is selected of a material, such as aluminum to frictionally engage with the material of clutch disc 14 so as to rotate disc 18 therewith. The degree of friction and the tension of spring 52 are selected to ensure enough torque by the take-up reel to wind the film therearound. In this preferred embodiment, drive 34 is continuously powered so long as the projector motor is energized. However, this friction is selected so that when the film is not being moved through the projector, slippage will occur between the weight and disc 14. Hence, this clutch arrangement prevents build-up of enough tension within the film to break that film.

In an alternative embodiment, driver 34 can be mounted for selective engagement with disc 18, for example, by pivoting the driver away when the projector is operated in either reverse operational mode or the still projection mode.

The degree of friction of weight 54 against the periphery of driven disc 14, the tension on spring 52, and the mass of weight 54 are selected, however, so that upon changing the projector to the reverse projection mode, the take-up reel can be rotated to unwind film without undue tension on the film. Since the take-up is unidirectionally powered in a forward projection mode, the film is to be pulled so as to be unwound from the take-up reel by the imeptus of other components of the projector. Thus, weight 54 must have a sufficiently light frictional engagement with the periphery of disc 14 to slip relative thereto during reverse projection without exerting undue strain on the other projector components. Because the reel 20 is powered for forward rotation, the instant the reverse projection mode is interrupted, the drive overcomes the slippage between weight 54 and rim 36 of disc 14, thereby preventing film spill due to inertia of the reel, which inertia would tend to cause said reel to continue its rotation in the reverse direction.

Tension on spring 52 and the mass of weight 54 are also selected to enable weight 54 to move out of engagement with the periphery of driven disc 14 during the rewind mode of the projector. During rewind mode, the film is wound back upon the supply reel at a high linear speed. Hence, it is desirable that the take-up reel rotate freely without undue restraint. As the film is pulled from the reel at the start of the rewind operation, the reel rotates first slowly, then more rapidly. After the rate of rotation of the take-up reel exceeds the rate attained during the reverse projection mode, centrifugal force pulls weight 54 from engagement with disc 14, as seen in dashed lines in FIG. 3. A cylindrical rim portion 60 about the periphery of plate 18 prevents undue radial movement of weights 54 when the rate of rotation of plate 18 becomes highest as the last convolutions of film are pulled therefrom.

With weight 54 free of disc 14 during high speed rewind, plate 18 can rotate freely at the maximum rate caused by pulling of the film from the take-up reel. When the end of the film is pulled from the take-up reel, the reel inherently begins to slow, and the centrifugal force on the weight proportionately lessens until the weight again engages the periphery of disc 14. At this time, the reel is quickly brought to zero rate of rotation, and started in the proper direction of rotation for the next operation of the take-up in forward mode.

In an embodiment of the drive arrangement not shown, the driven disc 14 is not powered during the reverse projection mode. In this arrangement, driver 34 can be either withdrawn from engagement with the disc or can be de-clutched from its motive source for free rotation. Thus, the reel is rotatable for reverse operation with less force than when disc 14 is unidirectionally powered as above described.

Referring now to the construction of reel 20, inner reel flange 22 and outer reel flange 28 are spaced apart by a hub structure 62, which supports the innermost convolution of film when the film is wound on the take-up reel. Inner reel flange 22 further includes a coupling means in the form of a plurality of yieldable fingers 68 arranged to cooperate in coupling relation with a bearing structure 72 of reel support plate 18 and similar fingers 70 surrounding that bearing structure. The latter fingers in the form of coupling structure have small catch lips 76, which after passing through the opening beyond fingers 68 of the inner flange 22, can spring radially outwardly to releasably catch behind a shallow ledge 78 formed on that flange (see FIG. 4). To prevent rotation of reel 20 relative to reel support plate 18, a plurality of key members 80 are formed on the reel engaging surface of the plate. Beside the alignment of the reel on the support by the hub, a small rim 82 extends from the periphery of support plate 18 on the reel engaging side thereof to surround the periphery of inner flange 22. When the reel is assembled on that plate, the keys 80 pass between the fingers 68 thereby assuring transmission of driving force between the components.

At a smaller diameter than the film engaging surface 62 of flange 22, the hub structure integral with that flange includes a step ring 88. The outer reel flange 28 is provided with a bearing opening 90 by which this flange can be supported on step ring 88 for rotation with, or relative to inner reel flange 22. Extending from the exterior surface of outer reel flange 28 is a grip portion 92 by which reel 20 can be removed from reel support plate 18. In this preferred embodiment, grip portion 92 is a cylinder molded integrally with outer reel flanges 28. To retain this outer reel flange with inner reel flange 22, cap 30 is inserted in the inner periphery of step ring 88. Cap 30 may be press fitted into the step ring, or in some other manner fixed thereto. With cap 30 in place the reel is assembled in a manner wherein one reel flange remains rotatable relative to the other whether the take-up reel is coupled to reel support plate 18 or is separated therefrom.

A restrainer rib 94 is molded to the exterior surface of outer reel flange 28. Within rib 94, and passing through a plurality of cut-outs 96 near the base of grip 92 as seen in FIG. 5, a yieldable and resilient shaped wire spring 98 is inserted. Wire spring 98 is wedged between cap 30 and outer flange 28 to apply pressure against the surface of that flange thereby urging that flange against hub structure 62. This wire spring may be shaped with straight legs or, as shown in FIG. 5, with deformed legs to partially surround step ring 88. Wire spring 98 also permits limited movement of outer flange 28 longitudinally relative to the axis defined by hub 62 so that film can be easily wound between the flanges or unwound from between them.

As has been suggested above, reel 20 is separable from the reel support plate 18, when desired. Normally, reel 20 is mounted thereon as a take-up for film passing through the projector with which it is used. However, should the trailing end of the film be pulled from the supply reel of that projector, it may be desirable to remove the take-up reel from the projector to permit easy re-threading of that film end to the supply reel. In the particular projector for which this take-up reel is designed, limited access to the take-up reel and particularly to the film path precludes readily re-threading the film path. Hence, the reel might be separated from the support plate and manually held by grip 92 while the film is attached to the supply and rewound thereon. No additional axle structure is required to restrain the reel as the film is pulled therefrom during a rewind operation. Since grip 92 is integral with outer reel flange 28, that flange remains stationary to protect the operator against possible injury as the rapidly moving film is pulled from the take-up reel. However, hub 62 and inner reel flange 22 rotate readily due to the supply pulling the film convolutions from the reel.

It is to be understood that the embodiments shown are illustrative of the principal operation of a take-up reel assembly having a separable reel and reel support and that certain changes, alterations, modifications or substitutions can be made in the structure of the device without departing from the spirit and scope of the claims.

What is claimed is:

1. In a reel assembly having a reel defined by an inner flange, an outer flange, and hub structure for supporting a web between the flanges, the improvement comprising:
   coupling means on said reel;
   a drivable reel support;
   coupling structure on said support wherein said reel may be selectively coupled therewith by said coupling means;
   grip means on one flange of said reel whereby said reel is separable from said support; and
   means associated with one of said reel flanges to support said flange for rotation relative to said other flange.

2. A reel assembly as in claim 1 including resilient means adjacent one of said flanges to bias said flange for relative movement axially of said hub structure.

3. A reel assembly as in claim 1 wherein said coupling structure includes a plurality of fingers extending in a reel engaging direction, and said coupling means includes a ledge portion to restrain said fingers against separation.

4. A reel assembly as in claim 1 wherein a cap is fixed to said hub structure to permit movement of said flanges relative to one another while restraining said flanges from said hub structure.

5. A reel assembly as in claim 1 wherein said coupling means includes yieldable fingers and said coupling structure includes at least one key insertable between a pair of said fingers whereby positive drive between said reel and said reel support is assured.

6. Improvements in a reel drive assembly comprising:
   a unidirectionally operable driver;
   a driven member powered by said driver;
   a drivable member;
   a clutch assembly to couple said driven member to said drivable member to make said drivable member bi-directionally operable at at least a pair of speeds;
   said clutch assembly comprising:
   spring means attached to said drivable member; and
   a mass normally biased by said spring means into frictional engagement with said driven member for transmitting rotational force from said driven member to said drivable member when said driven member is rotated by said driver, said drivable member being adapted for counter-rotation to said direction of rotation of said driven member at said two speeds, at one of which speeds said mass means is pulled from said driven member by centrifugal force wherein said drivable member is freely rotatable, and at the other of said speeds, said mass remains in slipping engagement with said driven member.

7. A reel drive assembly as in claim 6 wherein said drivable member is a reel support comprising coupling structure adapted to be coupled with a coupling means of a separable web handling reel.

8. Improvements in a reel assembly having a unidirectionally operable driver, and a reel defined by an inner flange, an outer flange, and hub structure to support a web between the flanges, the improvement comprising:
   a driven member powered by said driver;
   a drivable reel support plate adapted to be rotated by said driven member;
   a clutch assembly coupling said drivable reel support plate to said driven member for bi-directional rotation of said drivable plate at at least a pair of speeds;
   said clutch assembly comprising:
   spring means attached to said drivable member; and
   a mass normally biased by said spring means into frictional engagement with said driven member at one of said speeds, and pulled from said driven member by centrifugal force at the other of said speeds;
   yieldable finger coupling means on said reel;
   yieldable coupling structure on said support plate wherein said reel is adapted to be coupled therewith by said coupling means;
   grip means on one flange of said reel adapted to enable separation of said reel from said support plate; and
   means associated with one of said reel flanges wherein said other flange is rotatable relative to said one flange.

9. In a take-up reel assembly, the combination of:
   a first reel flange;
   a second reel flange associated with said first reel flange and defining therewith a space for accommodation of a wound web;
   means for releasably connecting said reel assembly to a reel support;
   means for manually holding said reel assembly while released from a reel support; and a hub disposed between said reel flanges for supporting a web while being wound on and unwound from said reel assembly and arranged for rotation relative the means for manually holding said reel assembly for returning therefrom a web to a web supply.

10. A combination according to claim 9 in which the means for manually holding said reel assembly comprises a thereto connected manually grippable member for restraining movement of said first reel flange when said hub rotates.

11. A combination according to claim 9 in which the hub is connected to said second reel flange for rotation therewith.

12. A combination according to claim 10 in which the means for releasably connecting said reel comprises a coupling structure carried by said second reel flange.

References Cited

UNITED STATES PATENTS

| | | | |
|---|---|---|---|
| 3,288,391 | 11/1966 | Keesling | 242—71.8 |
| 3,385,416 | 5/1968 | Frechette | 197—175 |

LEONARD D. CHRISTIAN, Primary Examiner

U.S. Cl. X.R.

242—68.3, 71.8